June 27, 1961  L. H. WHEELER  2,990,169
MACHINE FOR CUTTING PIPE
Filed Aug. 17, 1959  3 Sheets—Sheet 3

Lionel H. Wheeler
INVENTOR.

BY Charles E. Lightfoot
ATTORNEY

United States Patent Office 2,990,169
Patented June 27, 1961

2,990,169
MACHINE FOR CUTTING PIPE
Lionel H. Wheeler, 7654 Hereford St., Houston 17, Tex.
Filed Aug. 17, 1959, Ser. No. 834,224
7 Claims. (Cl. 266—23)

This invention relates to a pipe cutting machine, and more particularly to a machine which may be operated to make a number of different shapes of cuts in pipe for use in the fabrication of various types of pipe joints or connections.

In the fabrication of structures from pipe or the like, it is often necessary to cut the material to provide ends of various shapes which may be joined together, as by means of welding to form angular connections. It is also frequently necessary to cut holes in pipes into which branch pipes are to be connected and to form saddle cuts on the ends of the branch pipes which are to be fitted to such holes. Where the pipes to be connected are of different sizes the openings and ends must be variously shaped to permit the pipes to be closely fitted for welding together.

Heretofore in the production of pipe structures of this kind it has been customary to make the cuts by hand, various means, such as templates of numerous sizes and shapes, being employed for marking the pipes prior to cutting the same. Such hand methods of fabricating pipe structures are not only tedious and time consuming but are also likely to result in inaccurate fitting and waste of material.

Numerous attempts have been made to overcome the above disadvantages of the hand-shaping of pipe ends and the cutting of openings of various shapes in pipe, by the provision of machines for this purpose. Machines of this kind as heretofore constructed and operated have not, however, proven satisfactory, due to the complexity of their structure and the difficulty of adjusting the same for different shapes of the cut which is to be made and for different sizes of pipes. Moreover, machines of this character are usually of relatively heavy construction, not suitable for easy transportation, which makes it necessary that the pipe be pre-cut at some central location when the pipe is to be assembled elsewhere, as in the construction of pipelines or the like.

The present invention has for an important object the provision of a pipe cutting machine which is of relatively light construction and which may be readily transported from one place to another for use in the cutting of pipe at the location where the pipe is to be assembled and connected together.

Another object of the invention is to provide a pipe cutting machine which may be easily adjusted and applied to pipe of numerous different sizes and by whose use widely different shapes of cuts may be made.

A further object of the invention is the provision of a pipe cutting machine which is adapted to be positioned on the pipe to be cut and which rotates about the pipe during the cutting operation whereby the necessity for providing a support for holding the machine in a stationary position and means for rotating the pipe relative to the machine is eliminated.

A further object of the invention is to provide a pipe cutting machine embodying a cutting element and means for supporting the element for movement longitudinally and peripherally relative to a pipe to cause the element to move in a predetermined path during the cutting operation.

Another object of the invention is the provision of a pipe cutting machine embodying a cutting element, means for supporting and moving the element longitudinally and peripherally relative to a pipe and means for adjusting the relative rates of such longitudinal and peripheral movements to cause the element to form a cut of predetermined shape.

A still further object of the invention is to provide a pipe cutting device of the character referred to which is of simple design and rugged construction having parts which are easily replaceable and which is capable of withstanding the extreme conditions of hard usage to which machines of such character are customarily subjected.

The above and other important objects and advantages of the invention may best be understood from the following detailed description, constituting a specification of the same, when considered in conjunction with the annexed drawings, wherein—

Figure 1:
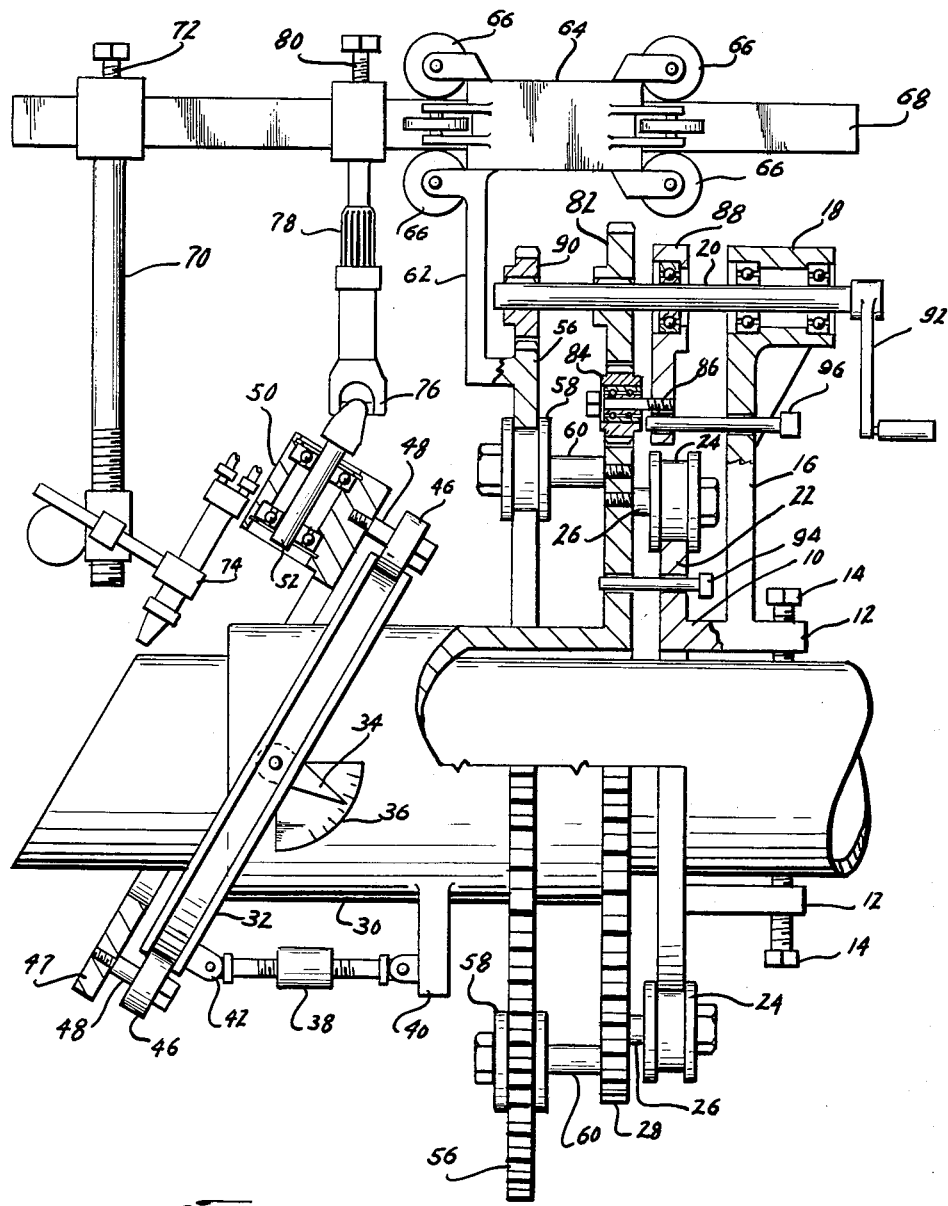
FIGURE 1 is a side elevational view, partly broken away and partly in cross-section, illustrating a preferred embodiment of the invention showing the same in position on a pipe and one form of cut which the machine is designed to make.

Referring now to the drawings in greater detail, the pipe cutting machine of the invention includes a ring-like supporting element 10, adapted to be positioned in surrounding relation to a pipe P to be cut, and having peripherally spaced, perforated lugs 12 extending from one side thereof, and which carry set screws 14, threadably extended there-through and whose inner ends are engageable with the external surface of the pipe P to hold the supporting ring immovably on the pipe. The support ring is also formed with a radially extending extension 16, connected to one of the lugs 12 and extending radially beyond the outer periphery of the support ring and which carries at its outer end a bearing 18, of conventional construction, through which a rotatable operating shaft 20 is extended.

The support ring 10 has a circular flange portion 22 which forms a trackway about which flanged rollers 24 may roll, which rollers are mounted for rotation on shafts 26 carried by an external gear 28 which is mounted on a tubular support 30 surrounding the pipe P in concentric relation to the support ring 10.

An angularly adjustable externally flanged guide ring 32 surrounds the tubular support 30 and is diametrically pivotally secured thereto for angular adjustment relative to the axis of the pipe P. The guide ring may be provided with a pointer 34, by which the angular position of the guide ring relative to the axis of the pipe P is indicated on a graduated scale 36 carried by the tubular support. The angular position of the guide ring 32 may be adjusted by means of a turnbuckle 38, attached at one end to a laterally extending lug 40 on the tubular support 30 and at the other end to a lug 42 attached to the guide ring whereby the guide ring may be adjusted and held in any desired angular position relative to the longitudinal axis of the pipe P.

A follower ring 44 is movably carried on the guide ring 32, for rotation relative thereto, as by means of rollers 46 positioned between the external flanges of the guide ring and rotatably mounted on shafts 48 carried on the follower ring. The follower ring carries a bearing 50 of conventional construction in which a shaft 52 is rotatably mounted.

An external gear 56 surrounds the tubular support 30, and is rotatably supported thereon, as by means of flanged rollers 58 positioned for rotatable engagement with the inner periphery of the ring gear, which forms an internal trackway for rollers, the rollers being rotatably mounted on shaft 60 attached to gear 28. The ring gear 56 has an extension 62 which extends radially beyond the gear and which carries at its outer end a carriage 64 upon which longitudinally spaced rollers 66 are rotatably mounted for rolling contact with a shaft 68 which extends through the carriage, and upon which a hanger 70 is adjustably mounted as by means of a set screw 72 for adjustment to any desired position longitudinally on the shaft. A cutting element, such as an acetylene torch 74 is carried by the hanger for longitudinal and angular adjustment thereon, to position the torch to perform a cutting operation on the pipe P.

A universal joint 76 is carried by the shaft 68 through a splined connection 78 which is adjustably connected to the shaft for adjustment to any desired longitudinal position on the shaft, as by means of a set screw 80, and this universal joint is connected to the shaft 52, so that the shaft 68 will be moved longitudinally relative to the axis of the pipe P by the follower ring 44 as the follower ring rotates about the guide ring 32.

An operating gear 82 is carried by the operating shaft 20 for rotation therewith in intermeshing engagement with a gear 84, rotatably mounted on a shaft 86 carried by a bearing 88 supporting on the shaft 20, which gear 84 is also in intermeshing engagement with the gear 28. A second operating gear 90 is mounted on the shaft 20 for rotation therewith in intermeshing engagement with the ring gear 86.

The shaft 20 is provided at one end with an operating crank 92.

A pin 94 is provided which is removably insertible through aligned perforations in the support ring 10 and in the gear 28, to hold the gear 28 and tubular support 30 against rotation relative to the support ring. A similar pin 96 is also provided which is removably insertible through aligned perforations in the extension 16 of the support ring 10 and in the bearing 88, to hold the gear 84 in intermeshing engagement wtih the gear 28.

Figure 4:
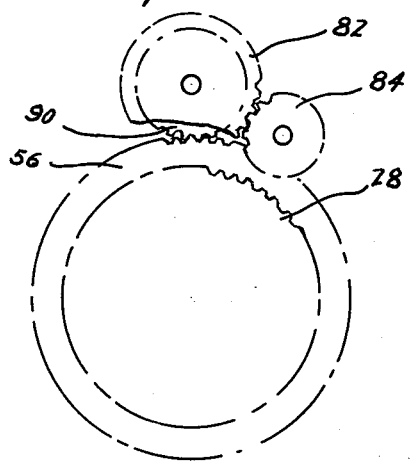
FIGURE 4 is a view similar to that of FIGURE 3 showing the relationship of the same parts and the movements of the same when the machine is used for making another type of cut.
Figure 6:
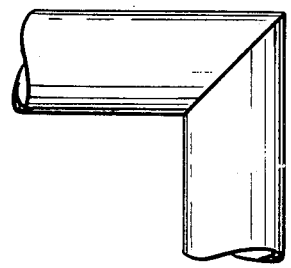
FIGURE 6 is a fagmentary plan view showing the manner in which the ends of two pipes may be cut by the use of the invention to form an angle connection; and, FIGURE 7 is a fragmentary side elevations view of a portion of a pipe showing a side opening of the type which may be cut therein by the machine of the invention for the connection thereto of a branch pipe.

In operating the machine of the invention, to cut off a pipe to form an end face thereon which is in a plane at an angle to the axis of the pipe, as seen in FIGURE 1, the turnbuckle 38 is operated to adjust the angular position of the guide ring 32 to the desired angle relative to the axis of the pipe, and the pin 96 is removed while the pin 94 is left in inserted position. In this condition of the apparatus the gear 84 may be swung aside to a position out of intermeshing engagement with the gear 28, as shown in FIGURE 4, so that the operating shaft 20 may be rotated without turning the gear 28 which will be held stationary relative to the pipe by the supporting element 10. Upon rotation of the operating shaft 20 with the apparatus in this condition, the gear 90 in intermeshing engagement with the gear 56 will cause the gear 56 to rotate on the rollers 58 to move the carriage 64, shaft 68 and cutting element 74 about the exterior of the pipe P to cut off the pipe. During such peripheral movement of the cutting element 74 about the pipe, the bearing 50 carried on the follower ring 44 will be moved longitudinally relative to the pipe due to the angular position of the guide ring 32 and the rollers 46 by which the follower ring is supported on the guide ring, and the shaft 68 will be correspondingly moved to cause the cutting element 74 to move longitudinally relative to the pipe as the cutting element moves about the pipe to produce a beveled or angular end cut as shown on FIGURES 1 and 6. It will be apparent that by thus forming end cuts on two sections of pipe P' and P", as seen in FIGURE 6, at an angle of 45° to the axes of the sections, a right angled joint can be formed by welding the sections P' and P" together, as shown in FIGURE 6, and also that by varying the angle of the cut, pipe joints of any desired angle can be produced.

Figure 5:
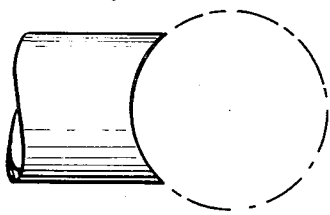
FIGURE 5 is a fragmentary view illustrating the manner in which two pipes may be cut by the use of the invention to form a T or branch pipe connection.

To produce a saddle cut, such as may be required to connect a branch pipe B into a main pipe M, as illustrated in FIGURE 5, the pin 94 may be removed and pin 96 inserted to hold the gear 84 in intermeshing engagement with the gear 28, while allowing the gear 28 to rotate relative to the support 10. Upon rotation of the operating shaft 20, with the apparatus in this condition, the gear 90 will actuate the gear 56 to rotate the cutting element 74 about the pipe in one direction, while the gears 82 and 84 will cooperate to rotate the gear 28 to rotate the guide ring 32 in the other direction about the pipe. By adjusting the angle of the guide ring 32 relative to the axis of the pipe, it will be apparent that the shape of the saddle cut S which is made on any size of branch pipe B may be adjusted to accurately fit the curvature of any size of main pipe M in the manner seen in FIGURE 5.

Figure 2:
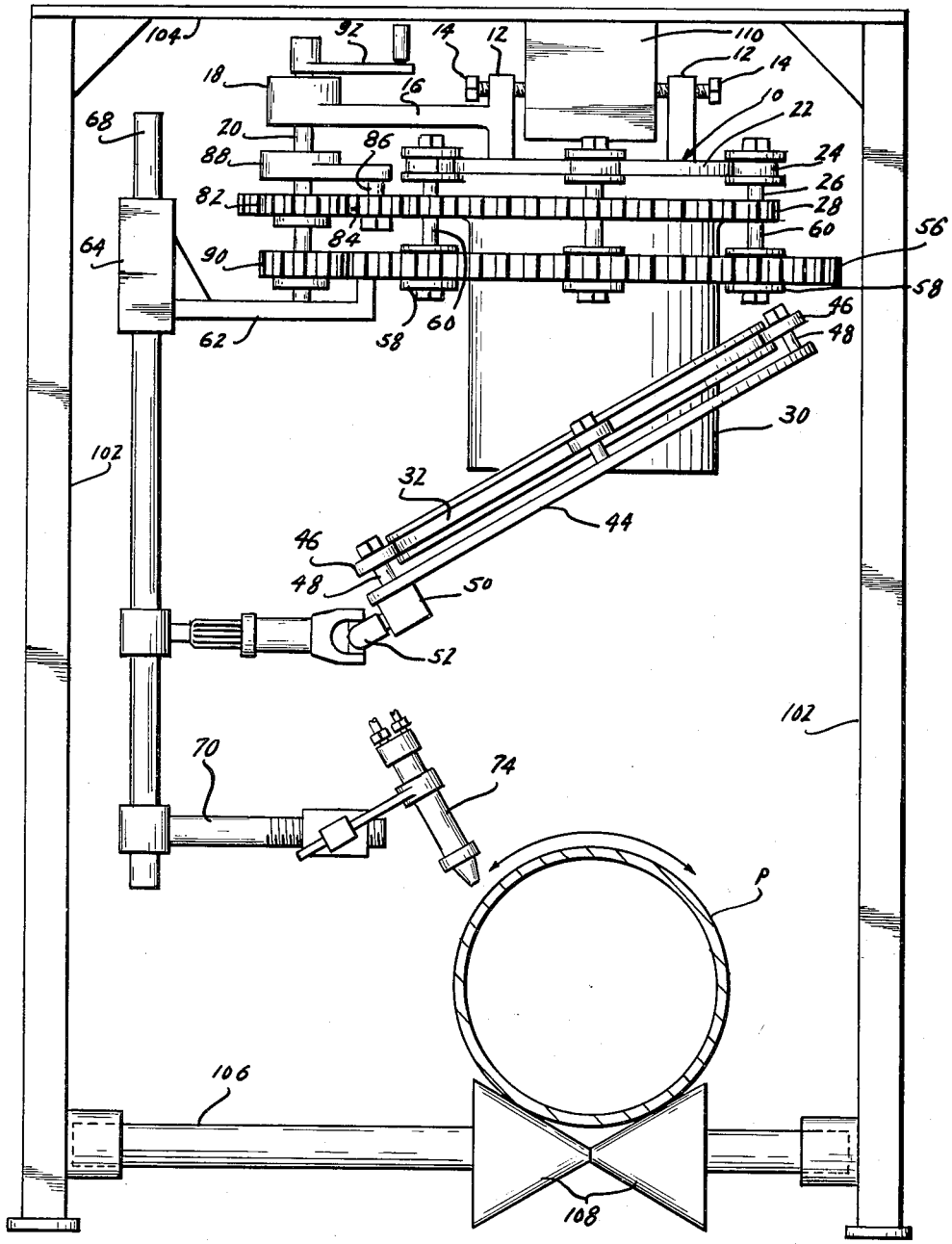
FIGURE 2 is an end elevational view showing the machine of the invention supported independently of the pipe to be cut and illustrating the manner in which the machine is operated to form certain predetermined shapes of cuts in pipe.
Figure 3:
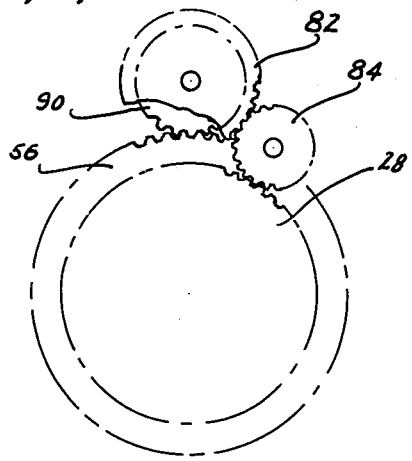
FIGURE 3 is a diagrammatic view illustrating the relationship between certain of the moving parts of the machine and the movements of the same when the machine is used for making one kind of cut of predetermined shape.
Figure 7:
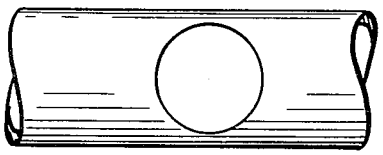

For the purpose of cutting a circular or other curved opening in a pipe, such as a main pipe M, as seen at O in FIGURE 7, into which a branch pipe B is to be connected, the apparatus of the invention may be supported in a suitable frame, such as that illustrated in FIGURE 2, having vertical uprights 102 whose lower ends rest upon the ground and whose upper ends are connected by one or more suitable cross-members 104.

One or more cross shafts, such as that shown at 106 in FIGURE 2, may be rotatably supported on the uprights 102, which shafts may be provided with pipe supporting portions 108 positioned to support the pipe P in the frame for longitudinal movement therein to position the pipe at the desired location to be cut. The frame is provided with suitable means, such as the downwardly extending tubular member 110 attached to the cross-member 104, which member 110 may be extended through the support ring 10 of the cutting apparatus to support the same in a hanging position as shown in FIGURE 2, when the set screws 14 are tightened.

By thus supporting the apparatus in the frame above the pipe P and suitably adjusting the angular position of the guide ring 32, as previously described, and with the pin 94 removed and pin 96 inserted, the shaft 20 may be rotated to move the cutting element 74 in an arcuate path as the cutting is moved vertically to make an opening in the pipe P of circular or other desired curved shape. It will be apparent that the guide ring 32 will make two complete turns as the cutting element 74 is rotated through one revolution, so that the cutting element will be caused to move from its lowermost position to its uppermost position twice during one revolution of the cutting element, thus causing the cutting element to accurately follow the curvature of the pipe M and maintaining the cutting element at a substantially constant distance from the pipe as the element moves in the desired path to make the cut.

The invention, constructed and operated in the manner described above thus provides a pipe cutting machine which is of simple and rugged construction, which is easily carried about, and which is adjustable to form numerous different shapes of cuts in pipes.

The invention is disclosed herein in connection with a certain specific embodiment of the same, but it will be understood that this is intended by way of example only and that various changes can be made in the construction and arrangement of the parts, within the spirit of the invention and the scope of the appended claims.

Having thus clearly shown and described the invention, what is claimed as new and desired to secure by Letters Patent is:

1. A machine for cutting pipe comprising an annular member adapted to be fixedly mounted on a pipe in surrounding relation thereto, support means movably mounted on said member for rotational movement about and longitudinal movement relative to the pipe, cutting means mounted on said support means in cutting relation to the pipe, guide means movably supported on said member in surrounding relation to and for rotation about the pipe and positioned for coaction with the support means to move the cutting means longitudinally of the pipe upon rotation of the support means about the pipe and means for causing said support means to rotate in one direction and said guide means to rotate in the other direction about the pipe.

2. A machine for cutting pipe comprising an annular member adapted to be fixedly mounted on a pipe in surrounding relation thereto, a movable element mounted on said member for rotational movement about the pipe, support means movably mounted on said element for movement relative thereto about and longitudinally of the pipe, cutting means carried by said support means in cutting relation to the pipe, guide means mounted on said element in position for coaction with the support means to move the support means longitudinally upon rotational movement of the support means about the pipe and means for causing rotation of said element and said support means in opposite directions about the pipe.

3. A machine for cutting pipe comprising an annular member adapted to be fixedly mounted on a pipe in surrounding relation thereto, a movable element mounted on said member for rotational movement about the pipe, support means movably mounted on said element for movement relative thereto about and longitudinally of the pipe, cutting means carried by said support means in cutting relation to the pipe, guide means mounted on said element in position for coaction with the support means to move the support means longitudinally upon rotational movement of the support means about the pipe and means for releasably connecting the element to the support means to cause the element and support means to rotate together about the pipe and means for causing the element and support means to rotate in opposite directions about the pipe when said releasable means is released.

4. A machine for cutting pipe comprising an annular member adapted to be fixedly mounted on a pipe in surrounding relation thereto, a movable element mounted on said member for rotational movement about the pipe, support means movably mounted on said element for movement relative thereto about and longitudinally of the pipe, cutting means carried by said support means in cutting relation to the pipe, guide means mounted on said element in position for coaction with the support means to move the support means longitudinally upon rotational movement of the support means about the pipe and means for simultaneously rotating said element and support means in opposite directions about the pipe.

5. A machine for cutting pipe comprising an annular member adapted to be fixedly mounted on a pipe in surrounding relation thereto, a movable element mounted on said member for rotational movement about the pipe, support means movably mounted on said element for movement relative thereto about and longitudinally of the pipe, cutting means carried by said support means in cutting relation to the pipe, guide means mounted on said element in position for coaction with the support means to move the support means longitudinally upon rotational movement of the support means about the pipe and means for causing rotation of said element in one direction about the pipe and for causing rotation of said support means in the opposite direction about the pipe at a fixed rate of speed relative to the speed of rotation of said element.

6. A machine for cutting pipe comprising a member adapted to be fixedly mounted on a pipe and having an external annular trackway surrounding the pipe, a first gear surrounding the pipe and rollingly supported on said trackway, a second gear surrounding the pipe and having an internal annular trackway, means on said first gear positioned for rolling engagement with said internal trackway to support said second gear for rotation about the pipe, support means movably carried by the second gear for movement therewith about and for longitudinal movement independently of said second gear relative to the pipe, guide means carried by the first gear for rotation therewith about the pipe and positioned for coaction with said support means to move the support means longitudinally upon rotation of the support means about the pipe, cutting means carried by the support means in cutting relation to the pipe, and means for causing the gears to rotate together about the pipe.

7. A machine for cutting pipe comprising a member adapted to be fixedly mounted on a pipe and having an external annular trackway surrounding the pipe, a first gear surrounding the pipe and rollingly supported on said trackway, a second gear surrounding the pipe and having an internal annular trackway, means on said first gear positioned for rolling engagement with said internal trackway to support said second gear for rotation about the pipe, support means movably carried by the second gear for movement therewith about and for longitudinal movement independently of said second gear relative to the pipe, guide means carried by the first gear for rotation therewith about the pipe and positioned for coaction with said support means to move the support means longitudinally upon rotation of the support means about the pipe, cutting means carried by the support means in cutting relation to the pipe, and means for causing the gears to rotate in opposite directions about the pipe.

References Cited in the file of this patent

UNITED STATES PATENTS

| | | |
|---|---|---|
| 1,852,412 | Hickey | Apr. 5, 1932 |
| 2,389,286 | Watkins | Nov. 20, 1945 |
| 2,408,517 | Howard | Oct. 1, 1946 |
| 2,459,823 | Lebedeff | Jan. 25, 1949 |